(12) United States Patent
Taylor

(10) Patent No.: US 7,830,684 B2
(45) Date of Patent: Nov. 9, 2010

(54) REVERSE BIASING ACTIVE SNUBBER

(75) Inventor: Robert J. Taylor, Mesquite, TX (US)

(73) Assignee: Lineage Power Corporation, Plano, TX (US)

(*) Notice: Subject to any disclaimer, the term of this patent is extended or adjusted under 35 U.S.C. 154(b) by 351 days.

(21) Appl. No.: 11/954,604

(22) Filed: Dec. 12, 2007

(65) Prior Publication Data

US 2009/0154204 A1    Jun. 18, 2009

(51) Int. Cl.
*H02H 7/125* (2006.01)
*H02H 3/22* (2006.01)

(52) U.S. Cl. .................. 363/52; 363/21.06; 363/77; 361/111

(58) Field of Classification Search ............ 363/21.03, 363/21.06, 21.14, 56.11, 56.12, 17, 52, 53, 363/76, 77, 80, 81, 89, 127; 361/111
See application file for complete search history.

(56) References Cited

U.S. PATENT DOCUMENTS 6,882,548 B1 * 4/2005 Jacobs et al. ............. 363/21.06

* cited by examiner

*Primary Examiner*—Gary L Laxton

(57) ABSTRACT

The present invention provides a transient suppression circuit for use with a rectifier coupled to a transformer. In one embodiment, the transient suppression circuit includes a triggering section configured to provide a timing signal corresponding to a dead time of the rectifier. Additionally, the transient suppression circuit also includes a biasing section coupled to the triggering section and configured to apply a reverse bias voltage to the rectifier based on the timing signal.

24 Claims, 4 Drawing Sheets

REVERSE BIASING ACTIVE SNUBBER

TECHNICAL FIELD OF THE INVENTION

The present invention is directed, in general, to power conversion and, more specifically, to a transient suppression circuit, a method of operating a transient suppression circuit and a power converter employing the circuit or the method.

BACKGROUND OF THE INVENTION

A power converter converts an input voltage waveform into a specified output voltage waveform. In many power processing applications requiring a DC output, switched-mode DC/DC converters are frequently employed to advantage. DC/DC converters generally include an inverter, an isolation transformer and a rectifier on a secondary side of the isolation transformer. The inverter usually uses a switching device, such as a field effect transistor, that converts the DC input voltage to an AC voltage. Then, the isolation transformer transforms the AC voltage into another value, and the rectifier generates the desired output DC voltage. The rectifier may include one or more rectifying diodes that conduct the load current only when forward-biased in response to the input waveform to the rectifier.

Unfortunately, the rectifying diode suffers from a reverse recovery condition when transitioning from conduction to a non-conduction state. During this reverse recovery condition, the diode current reverses direction, causing excess energy to be stored in the leakage inductance of the isolation transformer and wasted power in the diodes. The energy stored in the leakage inductance is dissipated in a resonant manner with the junction capacitance of the rectifying diode, causing oscillation (or ringing) and overshoot in the voltage waveform of the rectifying diode. As a result, the converter suffers an efficiency loss that impairs its overall performance.

A traditional manner of reducing these rectifying diode losses is to use a snubber circuit that is coupled to the rectifying diodes. For example, the snubber circuit may be a resistor-capacitor-diode (RCD) snubber circuit. The RCD snubber circuit dampens oscillations in the rectifier voltage. During each switching transient, the reverse recovery energy due to the recovery process of the diodes is first stored in the snubber capacitor and then nearly all of the energy is dissipated in the snubber circuit resistor. As the output power increases, the power dissipated in the snubber resistor becomes significant thereby usually limiting the RCD snubber to lower power applications.

To reduce the power loss in the snubber resistor, a lossless snubber circuit may be used, which operates in a manner similar to the RCD snubber circuit. However, the energy taken into this snubber circuit is recovered to an auxiliary inductor through oscillation with a lossless snubber capacitor. This snubber circuit loses its effectiveness where small duty cycle ratios are involved, since there is insufficient time to discharge the energy stored in the snubber circuit.

An alternative approach is to employ a saturable reactor snubber circuit in series with the rectifying diode. The saturable reactor has an amorphous core that makes a transition between low impedance (i.e., saturation) and high impedance with relatively low core losses. When the rectifying diode is conducting, the saturated reactor provides low impedance thereby allowing the current to flow freely. However, when the rectifying diode transitions from conducting to a non-conducting state causing reverse recovery to occur, the reactor provides high impedance thereby reducing the reverse current flow. Unfortunately, the saturable reactor may have to be cooled by forced air to avoid overheating.

Yet another approach to manage the losses associated with the reverse recovery condition is to employ a clamp circuit coupled to the rectifying diodes. This clamp circuit limits the peak voltage and reduces the stress across components within the converter. An advantage associated with such a circuit is that a clamp circuit does not dissipate energy in the converter. Unfortunately, the clamp circuit is generally limited to applications wherein the output voltage of the converter is fixed. Modifications can be made to the clamp circuit, however, to make it independent of the output voltage. For example, a coupling transformer may be connected across the main transformer effectively recovering excess transient energy to the primary side of the transformer. Unfortunately, the coupling transformer of the clamp circuit is generally comparable in size to the main transformer.

Accordingly, what is needed in the art is an enhanced way to suppress a reverse recovery condition associated with a rectifier.

SUMMARY OF THE INVENTION

To address the above-discussed deficiencies of the prior art, the present invention provides a transient suppression circuit for use with a rectifier coupled to a transformer. In one embodiment, the transient suppression circuit includes a triggering section configured to provide a timing signal corresponding to a dead time of the rectifier. Additionally, the transient suppression circuit also includes a biasing section coupled to the triggering section and configured to apply a reverse bias voltage to the rectifier based on the timing signal.

In another aspect, the present invention provides a method of operating a transient suppression circuit for use with a rectifier coupled to a transformer. The method includes providing a timing signal corresponding to a dead time of the rectifier and applying a reverse bias voltage to the rectifier based on the timing signal.

The present invention also provides, in yet another aspect, a power converter. The power converter includes a primary circuit having primary switches to couple a DC voltage source to a primary winding of a transformer. The power converter also includes a rectifier coupled between a secondary winding of the transformer and an output filter circuit. The power converter further includes a transient suppression circuit coupled to the rectifier. The transient suppression circuit has a triggering section that provides a timing signal corresponding to a dead time of the rectifier. The transient suppression circuit also has a biasing section that is coupled to the triggering section and applies a reverse bias voltage to the rectifier based on the timing signal.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention.

Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

As discussed previously, snubbers often employ an absorptive technique to control the energy in the voltage transient associated with the reverse recovery condition of a rectifier, such as a diode or an FET synchronous rectifier. Embodiments of the present invention prevent a diode rectifier (or a body diode of the FET synchronous rectifier) from conducting during a dead time associated with the rectification process, thereby preventing the voltage transient. This action is accomplished by applying a sufficient reverse bias voltage to the rectifier early in the dead time period when the rectifier is still conducting. Additionally, reflection of this voltage back to primary switches may serve to provide them with a zero voltage switching (ZVS) condition.

Principles of the present invention may be applied to other power converter topologies different from the embodiments of FIGS. 1A and 1B below. Examples of these topologies include an active-clamp forward converter, a standard forward converter, a half bridge converter, an asymmetrical half bridge converter and push-pull converters.

Figure 1A:
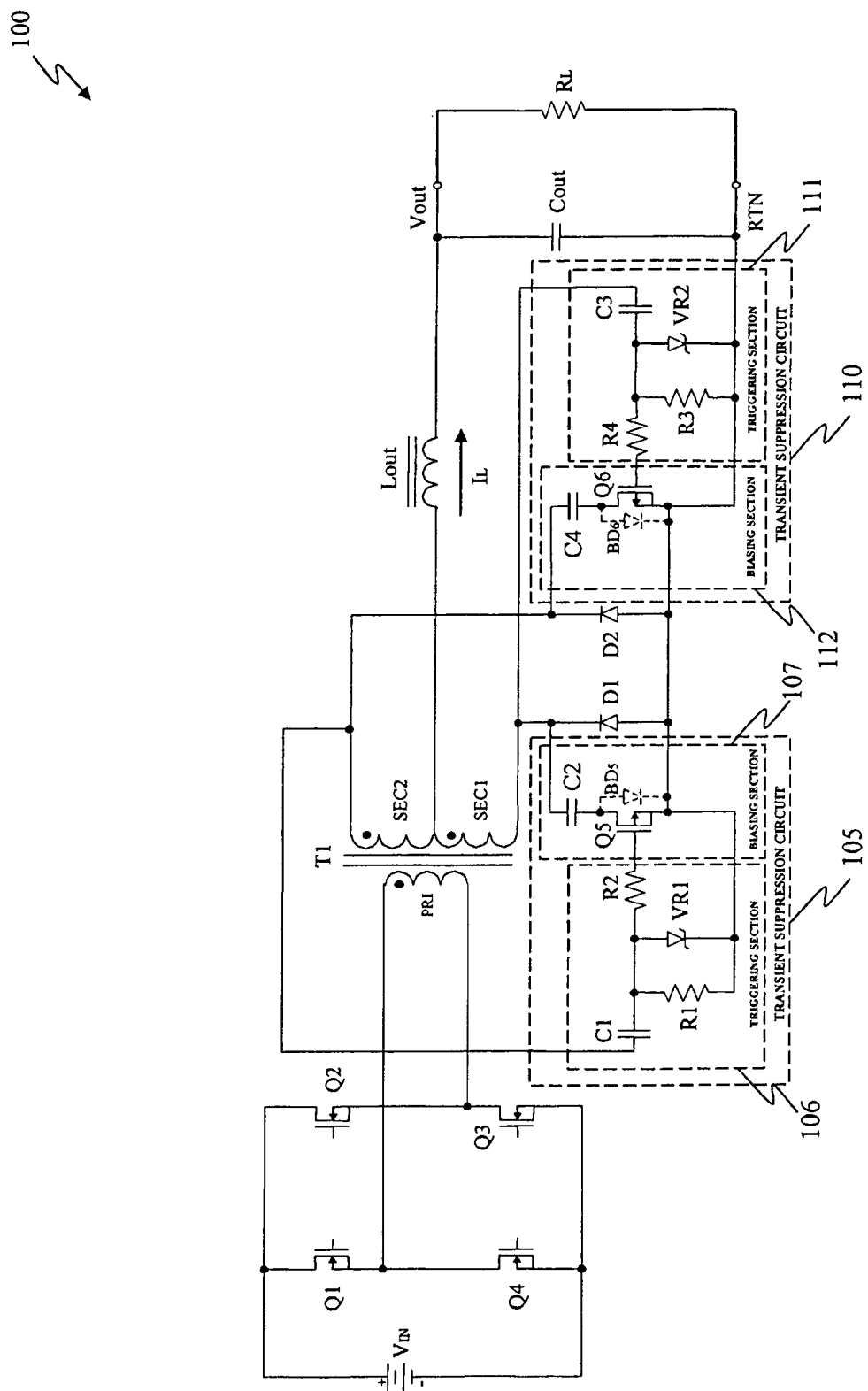
FIG. 1A illustrates a system diagram of an embodiment of a power converter constructed in accordance with the principles of the present invention.

Referring initially to FIG. 1A, illustrated is a system diagram of an embodiment of a power converter, generally designated 100, constructed in accordance with the principles of the present invention. The power converter 100 includes a primary circuit having first and second pairs of primary switches Q1, Q3 and Q2, Q4 that are coupled between an input voltage $V_{IN}$ and a primary winding PRI of a transformer T1. The power converter 100 also includes first and second rectifiers D1, D2 that are coupled between first and second secondary windings SEC1, SEC2 and an output filter circuit to supply a load current $I_L$ to a load $R_L$. The first and second secondary windings SEC1, SEC2 are connected to form a center-tapped secondary winding, as shown. The output filter circuit has an output inductor $L_{OUT}$ and an output capacitor $C_{OUT}$ that are coupled to the load $R_L$.

The power converter 100 further includes first and second transient suppression circuits 105, 110 coupled to the first and second rectifiers D1, D2 and the second and first secondary windings SEC2, SEC1, respectively. The first transient suppression circuit 105 includes a first triggering section 106 having an input coupled to the second secondary winding SEC2 and a first biasing section 107 having an output that is coupled to the first rectifier D1. Similarly, the second transient suppression circuit 110 includes a second triggering section 111 having an input coupled to the first secondary winding SEC1 and a second biasing section 112 having an output that is coupled to the second rectifier D2.

The first pair of primary switches Q1, Q3 is controlled to connect the input voltage $V_{IN}$ across the primary winding PRI during a first period. Similarly, the second pair of primary switches Q2, Q4 is controlled to connect the input voltage $V_{IN}$ across the primary winding PRI during a second period. First and second dead times are employed between the first and second periods to prevent the primary switches Q1 and Q4 or Q2 and Q3 from conducting at the same time.

The first and second triggering sections 106, 111 provide a first and second timing signal from their respective second and first secondary windings SEC2, SEC1. In the illustrated embodiment, opposite ends of the center-tapped secondary winding of the transformer provide connections for each of the timing signals and rectifiers, respectively. In this embodiment, the timing signals are self-driven from the transformer T1 and correspond to a respective dead time when one of the first and second rectifiers D1, D2 is to become non-conductive. In the illustrated embodiment, the timing signals correspond to a completion of conduction times for each of the first and second pairs of primary switches Q1, Q3 and Q2, Q4.

The first and second biasing sections 107, 112 are coupled to their respective first and second triggering sections 106, 111 and enable them to apply a reverse bias voltage to their respective first or second rectifier D1, D2 based on the timing signal from the transformer T1. The reverse bias voltage is provided by a voltage across first and second reverse-bias capacitors C2, C4, which is developed during a non-conduction time of its respective rectifier. Applying the reverse bias voltage employs first and second recovery switches Q5, Q6 that are coupled to the respective first and second timing signals. Applying the reverse bias voltage circumvents a reverse recovery condition of the rectifier.

During conduction time of the primary switches, the load current $I_L$ is driven through the output inductor $L_{OUT}$ to the output capacitor $C_{OUT}$ and load $R_L$. The rectifier side of the output inductor $L_{OUT}$ is driven high during primary switch conduction. When the primary switches initially turn off, the output inductor $L_{OUT}$ is no longer being driven, and it adjusts its voltage to maintain flow of the load current $I_L$ to the output capacitor $C_{OUT}$ and load $R_L$. To accomplish this, the magnetic field of the output inductor $L_{OUT}$ collapses and reverses its voltage polarity (i.e., the output inductor $L_{OUT}$ becomes a source), which forward biases both rectifiers to drive the output capacitor $C_{OUT}$ and load $R_L$.

The current through the output inductor $L_{OUT}$ has both a triangle wave AC portion (not a sine wave) riding on top of the load current $I_L$, which is a DC portion. The AC portion ramps up during the conduction time of the primary switches and ramps down during the non-conduction time of the primary switches when the output inductor $L_{OUT}$ supports the load $R_L$. The ramping up portion of the current replenishes the energy taken from the output inductor $L_{OUT}$ during the ramping down portion of the current. The AC portion is normally small compared to the load current $I_L$.

Suppose that the first pair of primary switches Q1, Q3 is conducting, and that the first rectifier D1 is conducting to provide the load current $I_L$ at an output voltage $V_{OUT}$ to the load $R_L$. For this condition, assume that the bottom of the first secondary winding SEC1 is approximately zero volts (referenced to a voltage on the return RTN), the secondary center-tap is approximately the output voltage $V_{OUT}$ (when the duty cycle ratio is a maximum) and the top of the second secondary winding SEC2 is approximately twice the output voltage $2V_{OUT}$. The second rectifier D2 is non-conducting, and voltage across the second reverse-bias capacitor C4 charges to approximately twice the output voltage $2V_{OUT}$ through diode $BD_6$ connected in parallel to the second recovery switch Q6, since it is non-conducting and only becomes conducting when triggered by its timing signal. In FIG. 1A, diodes $BD_5$ and $BD_6$ are shown as body diodes of the first and second recovery switches Q5, Q6, respectively. However, they may be discrete diodes, as well.

Now suppose that the second pair of primary switches Q2, Q4 is conducting. The first rectifier D1 is now non-conducting, and the second rectifier D2 is conducting to provide the load current $I_L$ at the output voltage $V_{OUT}$ to the load $R_L$. For this condition, assume that the top of the second secondary winding SEC2 is approximately zero volts (referenced to a voltage on the return RTN), the secondary center-tap is approximately the output voltage $V_{OUT}$ and the bottom of the first secondary winding SEC1 is approximately twice the output voltage $2V_{OUT}$. The voltage across the second reverse-bias capacitor C4 maintains its value of approximately twice the output voltage $2V_{OUT}$ while lowering the drain voltage of the second recovery switch Q6 to a value of approximately $-2V_{OUT}$.

At the conclusion of conduction time for the second pair of power switches Q2, Q4, the second rectifier D2 becomes non-conducting and the voltage on the first rectifier D1 begins to drop quickly as the output inductor $L_{OUT}$ changes voltage polarity to maintain its current. This action forces the first rectifier D1 (and the second rectifier D2 depending on circuit parasitics) into conduction. The second triggering section 111 employs its shaping network (a coupling capacitor C3, a Zener diode VR2 and resistors R3 and R4) to shape and limit this timing signal. This causes the second recovery switch Q6 to conduct thereby applying a reverse recovery voltage to the second rectifier D2 from the second reverse-bias capacitor C4 having the value of approximately $-2V_{OUT}$. When the second recovery switch Q6 conducts, it forces the second rectifier D2 cathode end of the second reverse-bias capacitor C4 towards a voltage value of $2V_{OUT}$. The second rectifier D2 employs sufficient charge associated with this capacitor voltage to suppress reverse recovery in the second rectifier D2. Correspondingly, the first transient suppression circuit 105 works analogously to suppress reverse recovery in the first rectifier D1 at the conclusion of the first dead time.

Applying the reverse bias voltage to each of the rectifiers may provide a zero voltage switching (ZVS) condition for each pair of the primary switches Q1, Q3 and Q2, Q4 as they are coupled to the primary winding PRI of the transformer. A condition for ZVS may best be understood by viewing the power converter 100 as being bi-directional. During the dead time when the snubber is driving the rectifier toward a voltage value of $2V_{OUT}$, the secondary of the transformer T1 is also being driven. The primary voltage follows the secondary voltage, if the transformer has tight coupling. The voltage across the primary winding PRI will go to the input voltage $V_{IN}$ wherein the two ends of the primary winding PRI will be clamped by the body diode of its respective primary switch. Then, when the switch pairs conduct, there will be zero volts across each primary switch. There are many considerations for this to happen effectively. These include the amount of energy stored in the first and second reverse-bias capacitors C2, C4, the size of the drain-to-source capacitance of the primary switches, transformer coupling conditions and the primary leakage inductance of the transformer T1.

Figure 1B:
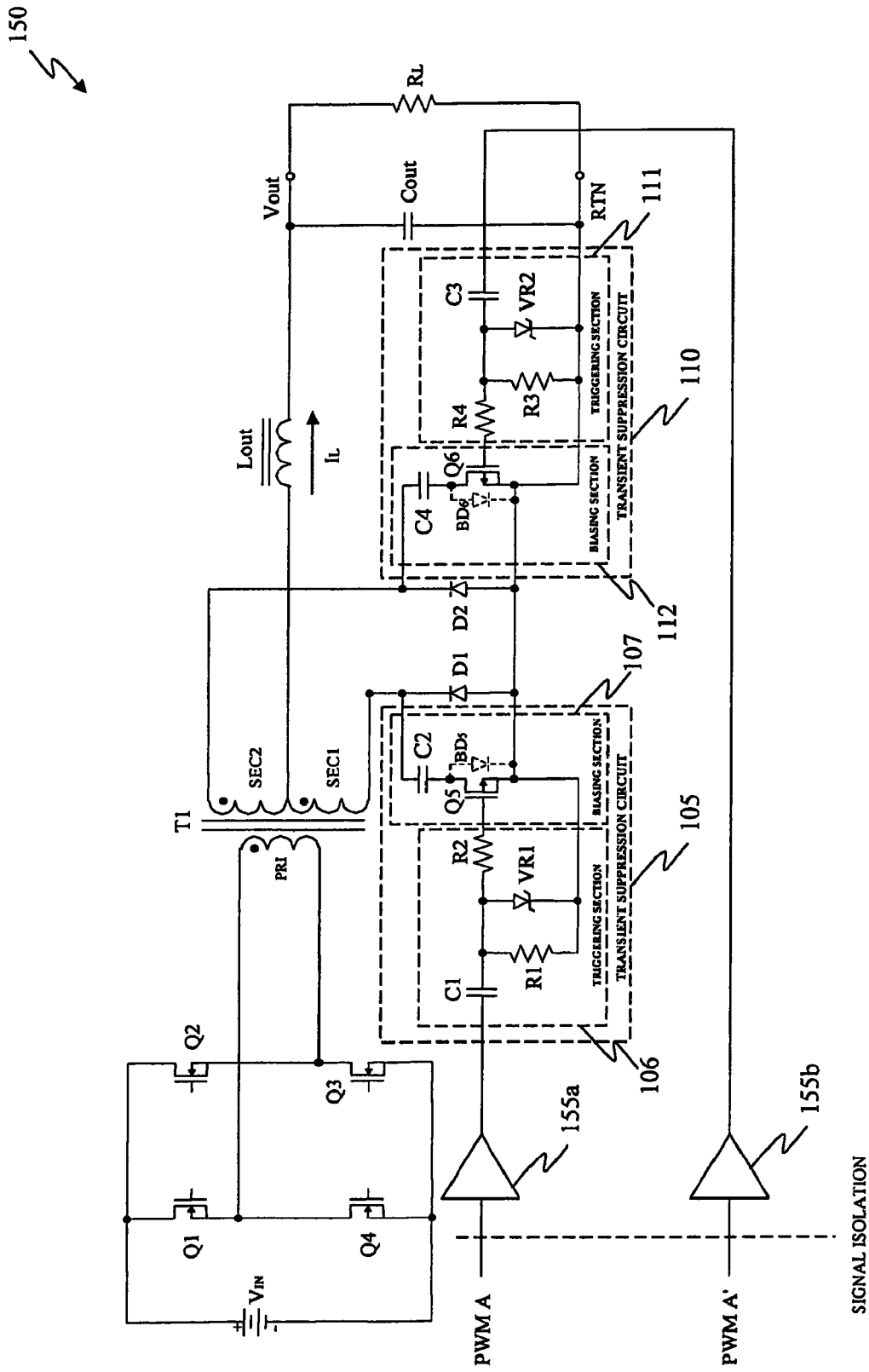
FIG. 1B illustrates a system diagram of another embodiment of a power converter constructed in accordance with the principles of the present invention

Turning now to FIG. 1B, illustrated is a system diagram of another embodiment of a power converter, generally designated 150, constructed in accordance with the principles of the present invention. General operation of the power converter 150 is analogous to the power converter 100. However, wherein the power converter 100 employs a self-driven timing signal that is internally derived from the transformer T1, the power converter 150 employs a timing signal that is externally derived from a pulse width modulation (PWM) controller (not directly shown). The PWM controller operates on the primary side of the power converter 150 wherein suitable isolation is provided from the secondary side of the power converter 150, as indicated.

In the illustrated embodiment, the PWM controller provides direct and complimentary PWM control signals A, A' through direct and complementary PWM drivers 155a, 155b, as shown. These direct and complementary PWM control signals A, A' are properly phased with the signal requirements of the first and second triggering sections 106, 111 to allow proper operation of the power converter 150.

Figure 2A:
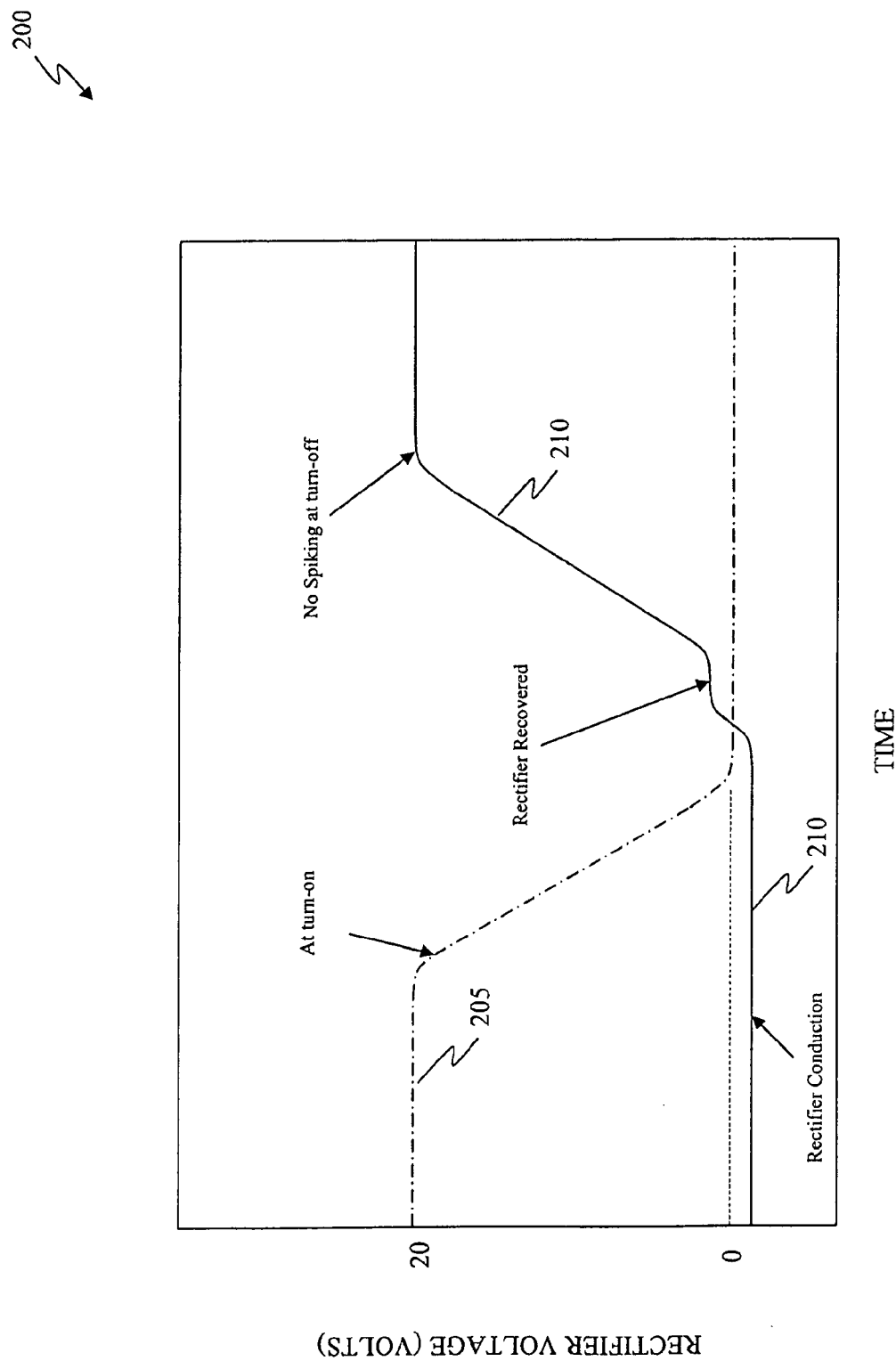
FIG. 2A illustrates first and second rectifier waveforms corresponding to the first and second rectifiers of FIG. 1.
Figure 2B:
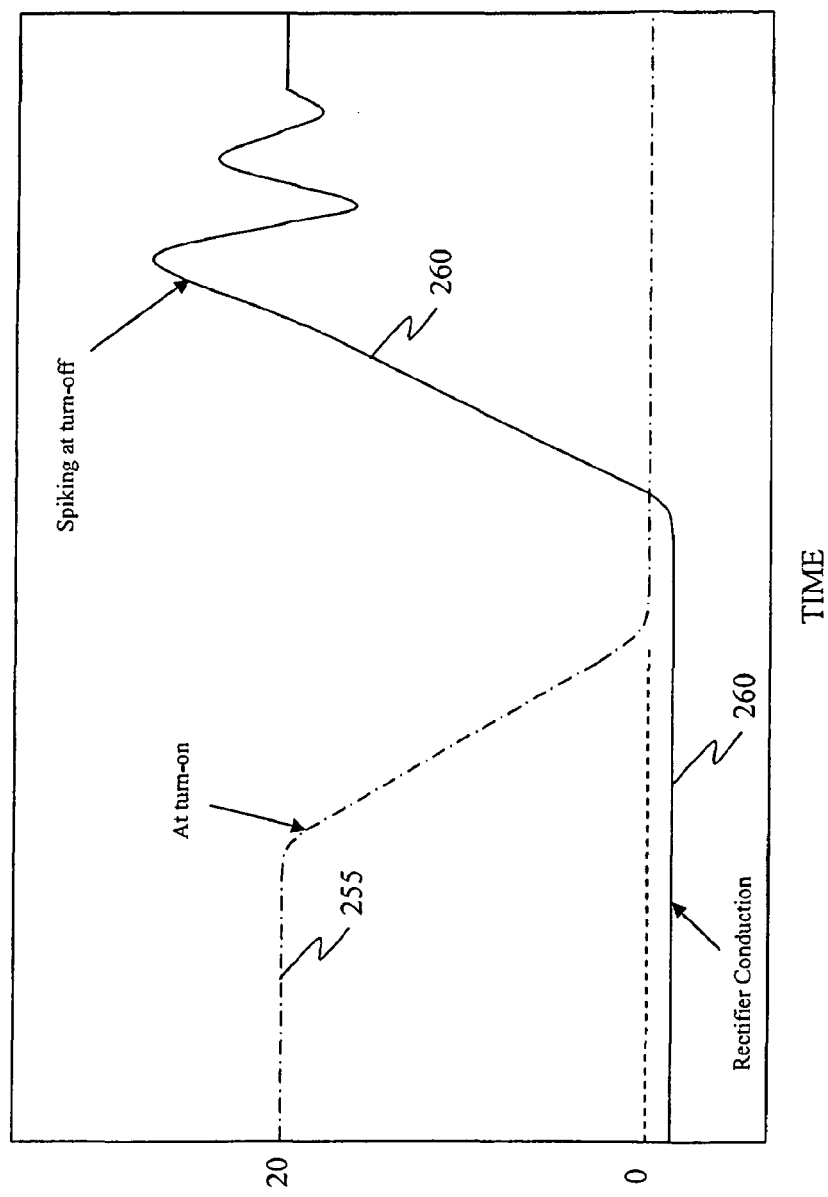
FIG. 2B illustrates, for comparison, similar first and second rectifier waveforms for a conventional power converter having rectifier reverse recovery problems.

Turning now to FIG. 2A, illustrated are rectifier waveforms, generally designated 200, corresponding to the rectifiers of FIGS. 1A and 1B. In FIG. 2A, first and second rectifier waveforms 205, 210 correspond to the first and second rectifiers D1, D2 of FIGS. 1A and 1B and show rectifier voltages across a dead time. The first rectifier waveform 205 illustrates (in an idealized format for simplicity and clarity) the first rectifier D1 transitioning from a non-conducting to a conducting state. Correspondingly, the second rectifier waveform 210 illustrates the second rectifier D2 transitioning from a conducting to a non-conducting state without exhibiting a reverse recovery condition as provided by embodiments of the present invention. A point wherein the second rectifier D2 has recovered is also shown on the second rectifier waveform 210. By way of contrast and for comparison, FIG. 2B shows similar first and second rectifier waveforms 255, 260 for a conventional power converter having rectifier reverse recovery problems.

In summary, embodiments of the present invention employing a transient suppression circuit, a method of operating a transient suppression circuit and a power converter employing the circuit or the method have been presented. Advantages include preventing the voltage transient associated with reverse recovery in transitioning to a non-conducting state of the rectifier (either a diode rectifier or a body diode of a FET synchronous rectifier). This action is accomplished by applying a sufficient reverse bias voltage to the rectifier early in the dead time period when the rectifier is conducting. Additionally, reflection of this voltage back to the primary switches may provide them with a zero voltage switching (ZVS) condition.

Although the present invention has been described in detail, those skilled in the art should understand that they can make various changes, substitutions and alterations herein without departing from the spirit and scope of the invention in its broadest form.

What is claimed is:

1. A transient suppression circuit for use with a rectifier coupled to a transformer, comprising:

a triggering section configured to provide a timing signal corresponding to a dead time of the rectifier; and a biasing section coupled to the triggering section and configured to apply a reverse bias voltage to the rectifier based on the timing signal, wherein opposite ends of a secondary winding of the transformer provide connections for the timing signal and the rectifier, respectively.

2. The circuit of claim 1 wherein the timing signal corresponds to completion of a conduction time of a primary switch.

3. The circuit of claim 1 wherein applying the reverse bias voltage provides recovery of a reverse recovery condition of the rectifier.

4. The circuit of claim 1 wherein the reverse bias voltage is provided by a capacitor voltage.

5. The circuit of claim 4 wherein the capacitor voltage is developed during a non-conduction time of the rectifier.

6. The circuit of claim 1 wherein applying the reverse bias voltage employs a switch coupled to the timing signal.

7. The circuit of claim 1 wherein a pulse width modulation signal provides direct control of the timing signal.

8. The circuit of claim 1 wherein applying the reverse bias voltage to the rectifier provides a zero voltage switching condition for primary switches coupled to a primary winding of the transformer.

9. A method of operating a transient suppression circuit for use with a rectifier coupled to a transformer, comprising:
   providing a timing signal corresponding to a dead time of the rectifier; and
   applying a reverse bias voltage to the rectifier based on the timing signal, wherein opposite ends of a secondary winding of the transformer provide connections for the timing signal and the rectifier, respectively.

10. The method of claim 9 wherein the timing signal corresponds to completion of a conduction time of a primary switch.

11. The method of claim 9 wherein applying the reverse bias voltage provides recovery of a reverse recovery condition of the rectifier.

12. The method of claim 9 wherein the reverse bias voltage is provided by a capacitor voltage.

13. The method of claim 12 wherein the capacitor voltage is developed during a non-conduction time of the rectifier.

14. The method of claim 9 wherein applying the reverse bias voltage employs a switch coupled to the timing signal.

15. The method of claim 9 wherein a pulse width modulation signal provides direct control of the timing signal.

16. The method of claim 9 wherein applying the reverse bias voltage to the rectifier provides a zero voltage switching condition for primary switches coupled to a primary winding of the transformer.

17. A power converter, comprising:
   a primary circuit having primary switches to couple a DC voltage source to a primary winding of a transformer;
   a rectifier coupled between a secondary winding of the transformer and an output filter circuit; and
   a transient suppression circuit coupled to the rectifier, including:
      a triggering section that provides a timing signal corresponding to a dead time of the rectifier, and
      a biasing section, coupled to the triggering section, that applies a reverse bias voltage to the rectifier based on the timing signal, wherein opposite ends of a secondary winding of the transformer provide connections for the timing signal and the rectifier, respectively.

18. The converter of claim 17 wherein the timing signal corresponds to completion of a conduction time of a primary switch.

19. The converter of claim 17 wherein applying the reverse bias voltage provides recovery of a reverse recovery condition of the rectifier.

20. The converter of claim 17 wherein the reverse bias voltage is provided by a capacitor voltage.

21. The converter of claim 20 wherein the capacitor voltage is developed during a non-conduction time of the rectifier.

22. The converter of claim 17 wherein applying the reverse bias voltage employs a switch coupled to the timing signal.

23. The converter of claim 17 wherein a pulse width modulation signal provides direct control of the timing signal.

24. The converter of claim 17 wherein applying the reverse bias voltage to the rectifier provides a zero voltage switching condition for primary switches coupled to a primary winding of the transformer.

* * * * *